G. M. GLENN.
MUD SHOE.
APPLICATION FILED JULY 11, 1919.
1,359,887. Patented Nov. 23, 1920.
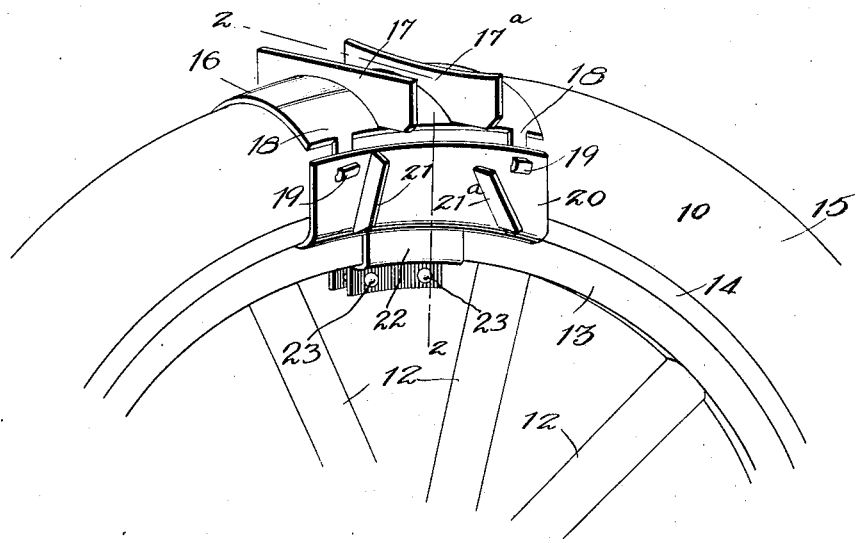
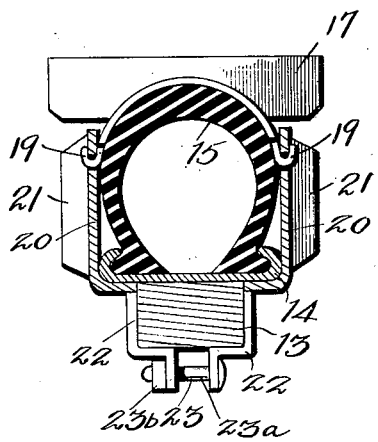
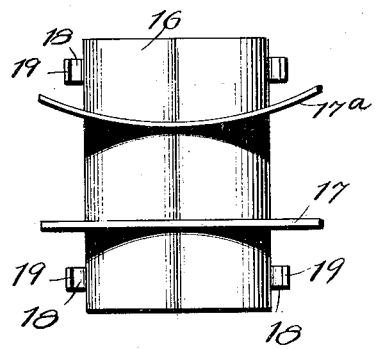
WITNESSES
INVENTOR
G. M. GLENN,
BY
ATTORNEYS

UNITED STATES PATENT OFFICE.

GEORGE M. GLENN, OF WICHITA, KANSAS.

MUD-SHOE.

1,359,887.  Specification of Letters Patent.  Patented Nov. 23, 1920.

Application filed July 11, 1919. Serial No. 310,176.

*To all whom it may concern:*

Be it known that I, GEORGE M. GLENN, a citizen of the United States, and a resident of Wichita, in the county of Sedgwick and State of Kansas, have made certain new and useful Improvements in Mud - Shoes, of which the following is a specification.

My invention relates to mud shoes or treads adapted to be applied to a tire of an automobile for extricating themselves from mud holes, sand mires, and other similar places.

An object of my invention is the provision of a mud shoe of simple construction, which can be quickly applied to and removed from a tire, and one which provides gripping means on the tread surface and sides of the tire to effect a positive traction grip.

I will describe one form of mud shoe embodying my invention, and will then point out the novel features thereof in claim.

In the accompanying drawings:—

Figure 1 is a fragmentary perspective view of an automobile wheel having applied thereto one form of mud shoe embodying my invention;

Fig. 2 is a vertical sectional view taken on the line 2—2 of Fig. 1;

Fig. 3 is a top plan view of the shoe detached from the tire.

Similar reference characters refer to similar parts in each of the several views.

Referring specifically to the drawings, 10 designates generally a conventional type of automobile wheel having the usual spokes 12, felly 13, pincher rim 14 and a resilient or pneumatic tire 15 mounted upon the rim in the usual manner.

The mud shoe or tread, which forms the subject-matter of my invention, comprises a single sheet 16 of suitable metal such as malleable iron, which is supported upon the tread surface of the tire 15 in the manner shown in Figs. 1 and 2. The sheet 16 constitutes the body of the shoe and as shown in Fig. 3, is of rectangular formation and curved transversely to conform to the contour of the tire 15. The body 16 is provided with transversely extending wings 17 and $17^a$, which constitute gripping members for securing the proper traction for the wheel when the latter rests in a mud hole. As shown in Fig. 3, the gripping wing 17 is of linear formation while the wing $17^a$ is curved longitudinally in the form of an arc, and in such direction that the concaved side of the wing faces the direction in which the wheel normally travels. Extending downwardly from the longitudinal edges of the body 16 are extensions 18, the lower end of such extensions being bent outwardly and upwardly to provide hooks 19 which fit in suitable openings formed in a pair of side plates 20. The plates 20 are disposed upon opposite sides of the tire 15, as clearly shown in Fig. 2, and are hingedly supported by the hooks 19 to permit the same to be swung out of engagement with the tire to allow the ready removal of the entire shoe. These plates 20 are formed with a pair of gripping wings 21, $21^a$, which are arranged in divergent relation to each other and extend substantially transversely of the tire so as to provide a proper traction means for the sides of the tire 15 to effect a removal of the wheel from a mud hole or the like. It is to be understood that the gripping wings 21 and $21^a$ coact with the wings 17 and $17^a$ to produce a shoe which will extricate a wheel from the most difficult places.

The entire shoe is securely clamped to the wheel at the desired point by means of a pair of jaws 22 which constitute extensions of the side plates 20, and are bent to snugly engage the opposite sides of the felly 13. These jaws 22 are clamped in firm engagement with the felly 13 by means of fastening members 23, which in the present instance comprise bolts and nuts $23^b$ as clearly shown in Fig. 2. It will be noted that the lower longitudinal edge of each plate 20 is bent at right angles to engage the underside of the rim 14, to thus lock the body 16 securely upon the tread surface of the tire.

From the foregoing description taken in connection with the accompanying drawing, it will be manifest that I have provided a simple and efficient mud shoe which will effectively extricate an automobile wheel from all places in which it is unable to secure the necessary traction when using the ordinary smooth tread surface of a tire.

Although I have herein shown and described only one form of mud shoe embodying my invention, it is to be understood that various changes and modifications may be made herein without departing from the spirit of the invention and the spirit and scope of the appended claim.

Having described my invention, what I claim is:—

A mud shoe comprising, a body curved to conform to the tread surface of a tire, gripping wings formed on the body, one of said wings being straight and the other curved in the direction of its length, extensions formed on the side edges of the body, hooks formed on the extensions, side plates mounted on the hooks for outward swinging movement, gripping wings formed on the plates and converging in the direction of the first gripping wings, clamping jaws formed on the plates, said plates being bent for engagement with the rim of a wheel and said jaws bent to embrace the felly of a wheel, and means for securing the jaws together.

GEORGE M. GLENN.